Patented Aug. 8, 1939

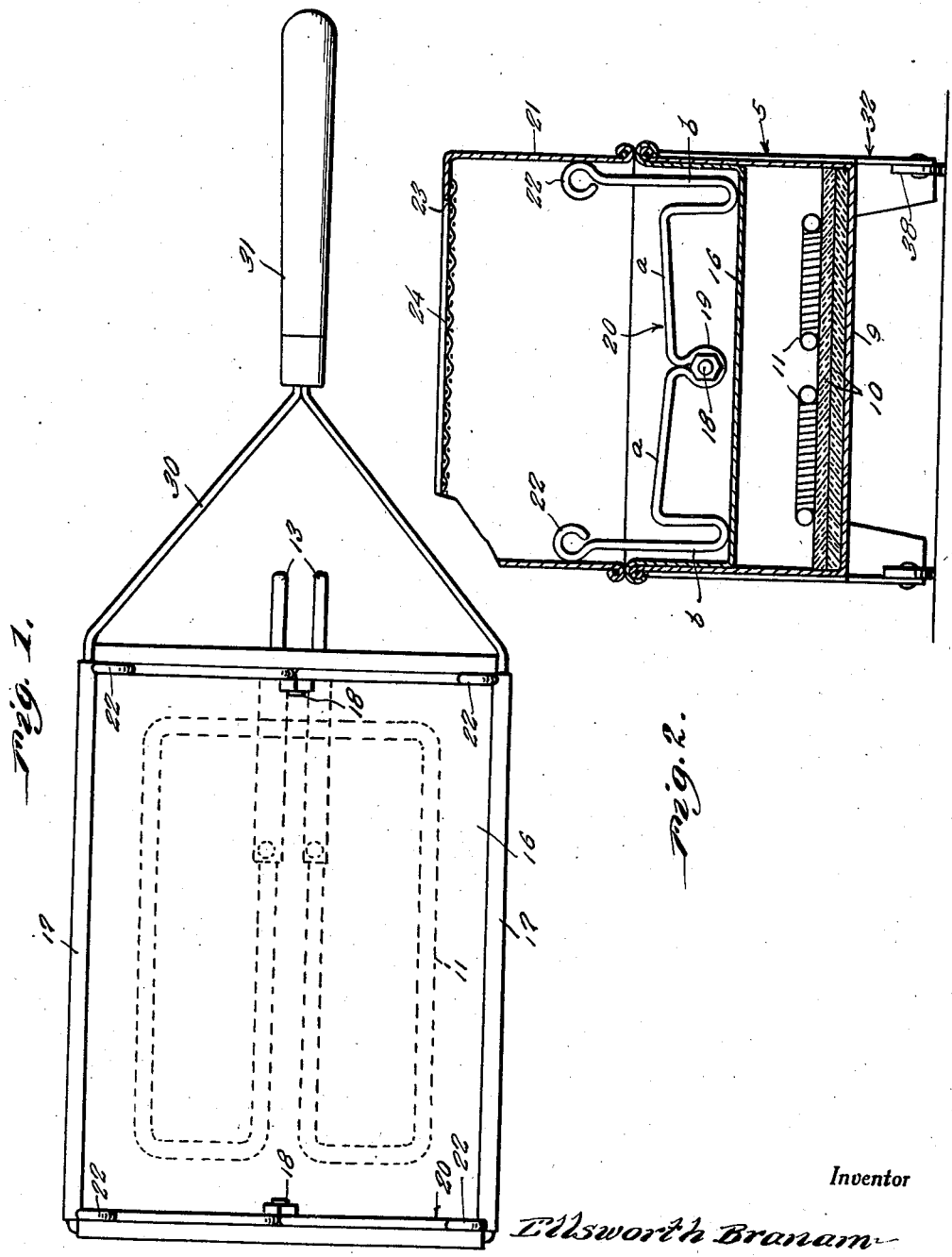

2,168,665

UNITED STATES PATENT OFFICE 2,168,665

CORN POPPER

Ellsworth Branam, Mendon, Ohio

Application June 14, 1938, Serial No. 213,705

5 Claims. (Cl. 53—4)

This invention appertains to new and useful improvements in corn popping utensils and more particularly to a utensil which is electrically heated.

The principal object of the present invention is to provide a corn popper which can be handled in a much more convenient and easy manner than the poppers of conventional design which require a flame for heat.

Another important object of the invention is to provide a corn popper of the electrical type which can be easily actuated to facilitate popping and the prevention of burning.

These and other important objects and advantages of the invention will become apparent to the reader of the following specification.

In the drawing:—

Figure 1 is a top plan view of the popper with the cover removed.

Figure 2 is a transverse sectional view of the popper.

Referring to the drawing wherein like numerals designate like parts, it can be seen that the popper consists of the rectangular-shaped shell 5 which is provided with the side wall 6, the end walls 7 and 8 and the bottom wall 9. Upon the bottom wall 9 are the sheets 10 of suitable insulating material and having suitable refractory property and upon these sheets is the electric heating element 11 connected to the binding structures 12 of the connector prongs 13 which extend outside of the end wall 7 of the shell 5.

Suitable cleat members 14 are secured by bolts 15 to the shell at the inside thereof to hold the sheets 10 properly in place.

Numeral 16 represents the corn receiving pan, the upper end portion of which is rolled outwardly with the upper edge of the shell 5 as at 17.

The end walls of this pan 16 are secured by bolts 18 to the end walls 7 and 8 of the shell 5 and these bolts 18 extend through the eye formation 19 at the intermediate portions of the wire detent structures 20, one being located at each end of the pan 16 for the purpose of holding the cover 21 over the pan 16.

Each wire detent 20 is of spring metal, the same having the laterally disposed arms a—a extending laterally from the eye 19 to merge with the downwardly and upwardly extending portions b—b, the free ends of these portions b extend upwardly above the top of the shell 5 and terminate in eyes 22 which tensionally bear against the inside of the side walls of the cover 21. The cover 21 has a rectangular-shaped opening 23 therein which is covered by the mesh 24 to prevent popping out of the corn while undergoing application of heat from the heating element 11.

While the foregoing specification sets forth the invention in specific terms, it is to be understood that numerous changes in the shape, size and materials may be resorted to without departing from the spirit and scope of the invention as claimed hereinafter.

Having described the invention, what is claimed as new is:

1. A corn popper comprising a corn-receiving receptacle, a cover for the receptacle, detent means for the cover, said detent means comprising an elongated spring member having its intermediate portion secured to the inner side of the receptacle and having its end portions bent upwardly and sprung outwardly to tensionally bear against the inside of the cover.

2. A corn popper comprising a corn-receiving receptacle, a cover for the receptacle, detent means for the cover, said detent means comprising an elongated spring member having its intermediate portion secured to the inner side of the receptacle and having its end portions bent upwardly and sprung outwardly to tensionally bear against the inside of the cover, the upper ends of the said fingers being bent to provide cover-engageable eye members.

3. A utensil of the character described comprising a receptacle, a cover for the receptacle, retaining means for the cover, said retaining means comprising a substantially U-shaped elongated spring member, securing means between the intermediate portion of the member and the inside of the receptacle, the upper portions of the leg portions of the U-shaped member being sprung outwardly to tensionally engage the inner side of the cover.

4. A utensil of the character described comprising a receptacle, a cover for the receptacle, retaining means for the cover, said retaining means comprising a substantially U-shaped elongated spring member, securing means between the intermediate portion of the member and the inside of the receptacle, the upper portions of the leg of the receptacle, the upper portions of the leg portions of the U-shaped member being sprung outwardly to tensionally engage the inner side of the cover, said U-shaped member having a substantial portion of its bight raised, the intermediate portion of the bight being formed to provide an eye, said securing means being disposed through the eye and carried by the receptacle.

5. A utensil of the character described comprising a receptacle, a cover having side walls and end walls adapted to abut the upper edges of the walls of the receptacle, a pair of U-shaped detents, one at each end of the receptacle, each of the said detents consisting of a bight portion having its mid-point bent to form an eye, securing means between the receptacle walls and the eyes of the detents, the bight portion of each detent being bent downwardly, outwardly and then upwardly to form a leg portion, said leg portions being sprung outwardly, each of the said leg portions at its upper end being formed with a loop to facilitate engagement of the cover thereover.

ELLSWORTH BRANAM.